(12) United States Patent
Tominaga et al.

(10) Patent No.: US 12,136,854 B2
(45) Date of Patent: Nov. 5, 2024

(54) ROTATING ELECTRICAL MACHINE

(71) Applicant: NIDEC CORPORATION, Kyoto (JP)

(72) Inventors: Takumi Tominaga, Kyoto (JP); Yuta Kimura, Kyoto (JP); Takeshi Honda, Kyoto (JP); Yosuke Tanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 314 days.

(21) Appl. No.: 17/848,400

(22) Filed: Jun. 24, 2022

(65) Prior Publication Data

US 2023/0006488 A1    Jan. 5, 2023

(30) Foreign Application Priority Data

Jun. 30, 2021 (JP) ................................ 2021-108973

(51) Int. Cl.
*H02K 1/276* (2022.01)

(52) U.S. Cl.
CPC .......... *H02K 1/276* (2013.01); *H02K 1/2766* (2013.01); *H02K 1/2773* (2013.01)

(58) Field of Classification Search
CPC ..... H02K 1/276; H02K 1/2766; H02K 1/2773
See application file for complete search history.

(56) References Cited

U.S. PATENT DOCUMENTS

2014/0001910 A1*  1/2014  Shibata ............... H02K 1/2773
                                                  310/156.43
2017/0098969 A1*  4/2017  Fukumoto .............. H02K 1/02

FOREIGN PATENT DOCUMENTS

| JP | 200264951 A | | 2/2002 | |
| JP | 5117833 B2 | * | 1/2013 | .......... H02K 1/2766 |
| JP | 2013132138 A | * | 7/2013 | |
| JP | 2019161786 A | * | 9/2019 | |

* cited by examiner

*Primary Examiner* — Gary A Nash
(74) *Attorney, Agent, or Firm* — HAUPTMAN HAM, LLP (57) ABSTRACT

A rotating electrical machine according to one aspect of the present invention includes: a rotor rotatable about a central axis; and a stator located radially outside the rotor. The rotor includes: a rotor core that includes a plurality of electromagnetic steel plates laminated in an axial direction and that has a plurality of accommodation holes; and a plurality of magnets respectively accommodated in the plurality of accommodation holes. The rotor core includes: a first recess recessed from a first core end face on a first axial side to a second axial side; a first swaged part provided on a bottom surface of the first recess; and a first protrusion that protrudes toward each of the magnets in a direction in which an inner peripheral edge of each of the accommodation holes intersects an axial direction, the first protrusion butting against a side face of the magnet.

7 Claims, 8 Drawing Sheets

ROTATING ELECTRICAL MACHINE

CROSS-REFERENCE TO RELATED APPLICATIONS

The present invention claims priority under 35 U.S.C. § 119 to Japanese Patent Application No. 2021-108973 filed on Jun. 30, 2021, the entire content of which is incorporated herein by reference.

FIELD OF THE INVENTION

The present invention relates to a rotating electrical machine.

BACKGROUND

A rotating electrical machine that includes a rotor core and a magnet placed in a hole provided in the rotor core is known. For example, an interior permanent magnet rotor is known in which an end part of a magnet inserted into a hole provided in a rotor core is held and fixed to the rotor core by swaging a steel plate located at an end of laminated steel plates constituting a yoke of the rotor core.

In the configuration as described above, the dimension of the laminated steel plates may be actually larger than the dimension of the magnet in the central axis direction of the rotor core due to manufacturing tolerance or the like. In such a case, when the steel plate located at the end in the central axis direction of the laminated steel plates is swaged, a portion protruding in a direction intersecting the central axis direction does not contact the magnet or butts against an end of the magnet in the central axis direction. When the swaged steel plate does not contact the magnet, the magnet cannot be fixed. In addition, when the swaged steel plate butts against the end of the magnet, the magnet may be damaged. As described above, the configuration described above has a problem that it is difficult to reliably fix the magnet to the rotor core while suppressing damage of the magnet.

SUMMARY

In one aspect of the present invention, an exemplary rotating electrical machine includes: a rotor that is rotatable about a central axis; and a stator that is located radially outside the rotor. The rotor includes: a rotor core that includes a plurality of electromagnetic steel plates laminated in an axial direction and that has a plurality of accommodation holes; and a plurality of magnets respectively accommodated in the plurality of accommodation holes. The rotor core includes: a first recess recessed from a first core end face on a first axial side to a second axial side; a first swaged part provided on a bottom surface of the first recess; and a first protrusion that protrudes toward each of the magnets in a direction in which an inner peripheral edge of each of the accommodation holes intersects the axial direction and that butts against a side face of the magnet.

The above and other elements, features, steps, characteristics and advantages of the present disclosure will become more apparent from the following detailed description of the preferred embodiments with reference to the attached drawings.

DETAILED DESCRIPTION

A rotating electrical machine according to an embodiment of the present invention will be described below with reference to the drawings. Note that the scope of the present invention is not limited to the embodiment described below, but includes any modification thereof within the scope of the technical idea of the present invention. Also note that scales, numbers, and so on of members or portions illustrated in the following drawings may differ from those of actual members or portions, for the sake of easier understanding of the members or portions.

A Z-axis direction appropriately illustrated in each drawing is a vertical direction in which a positive side is an "upper side" and a negative side is a "lower side". A central axis J appropriately illustrated in each drawing is a virtual line that is parallel to the Z-axis direction and extends in the vertical direction. In the following description, the term "axial direction", "axial", or "axially" refers to an axial direction of the central axis J, that is, a direction parallel with the vertical direction. The term "radial direction", "radial", or "radially" refers to a radial direction around the central axis J. The term "circumferential direction", "circumferential", or "circumferentially" refers to a circumferential direction about the central axis J. An arrow θ appropriately illustrated in each drawing indicates the circumferential direction. The arrow θ is directed in a clockwise direction around the central axis J when viewed from above. In the following description, a side to which the arrow θ is directed in the circumferential direction with a certain object as a reference, namely, a clockwise side as viewed from above is referred to as a "first circumferential side", and a side opposite to the side to which the arrow θ is directed in the circumferential direction with the certain object as the reference, namely, a counterclockwise side as viewed from above is referred to as a "second circumferential side".

The vertical direction, the upper side, and the lower side are merely terms for describing a relative positional relationship between the respective units, and an actual layout relationship and the like may be other than the layout relationship represented by these terms.

Figure 1:
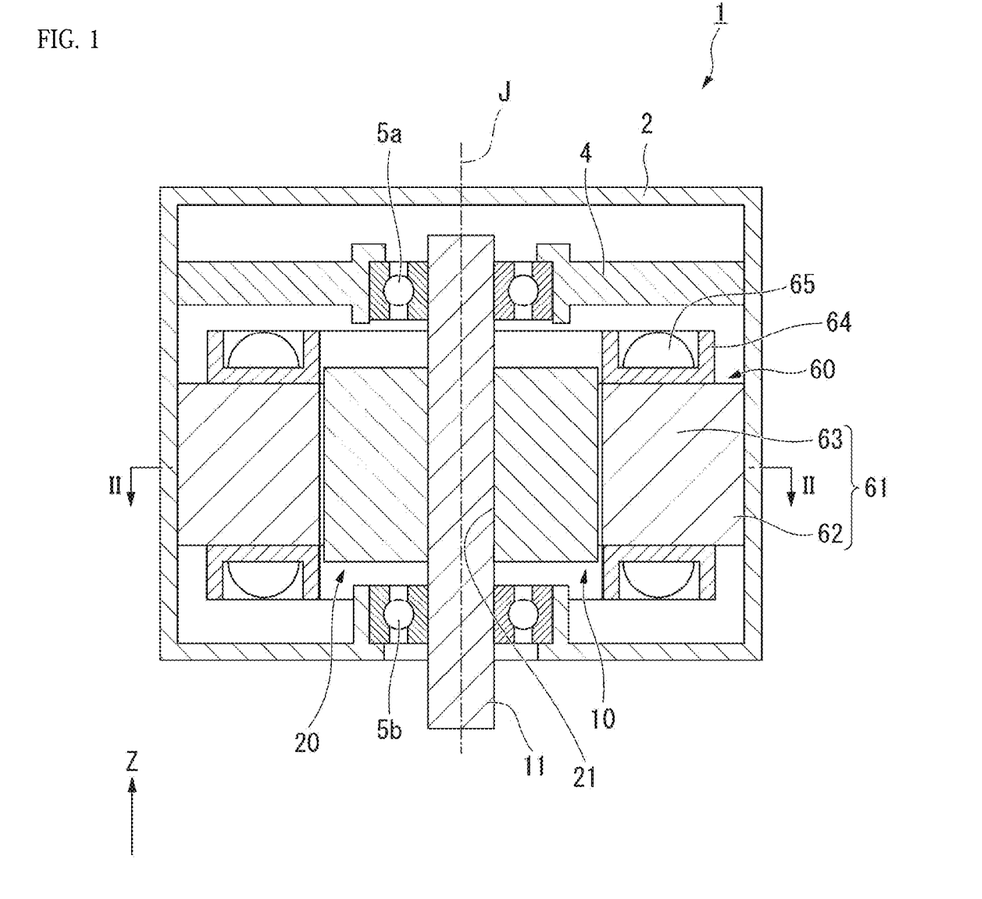
FIG. 1 is a sectional view illustrating a rotating electrical machine according to an embodiment.

As illustrated in FIG. 1, a rotating electrical machine 1 is an inner rotor type rotating electrical machine.

In the present embodiment, the rotating electrical machine 1 is a three-phase alternate-current rotating electrical machine. The rotating electrical machine 1 is, for example, a three-phase motor driven by being supplied with three-phase AC power. The rotating electrical machine 1 includes a housing 2, a rotor 10, a stator 60, a bearing holder 4, and bearings 5a and 5b.

The housing 2 accommodates therein the rotor 10, the stator 60, the bearing holder 4, and the bearings 5a and 5b. The bottom part of the housing 2 holds the bearing 5b. The bearing holder 4 holds the bearing 5a. Each of the bearings 5a and 5b is, for example, a ball bearing.

Figure 2:
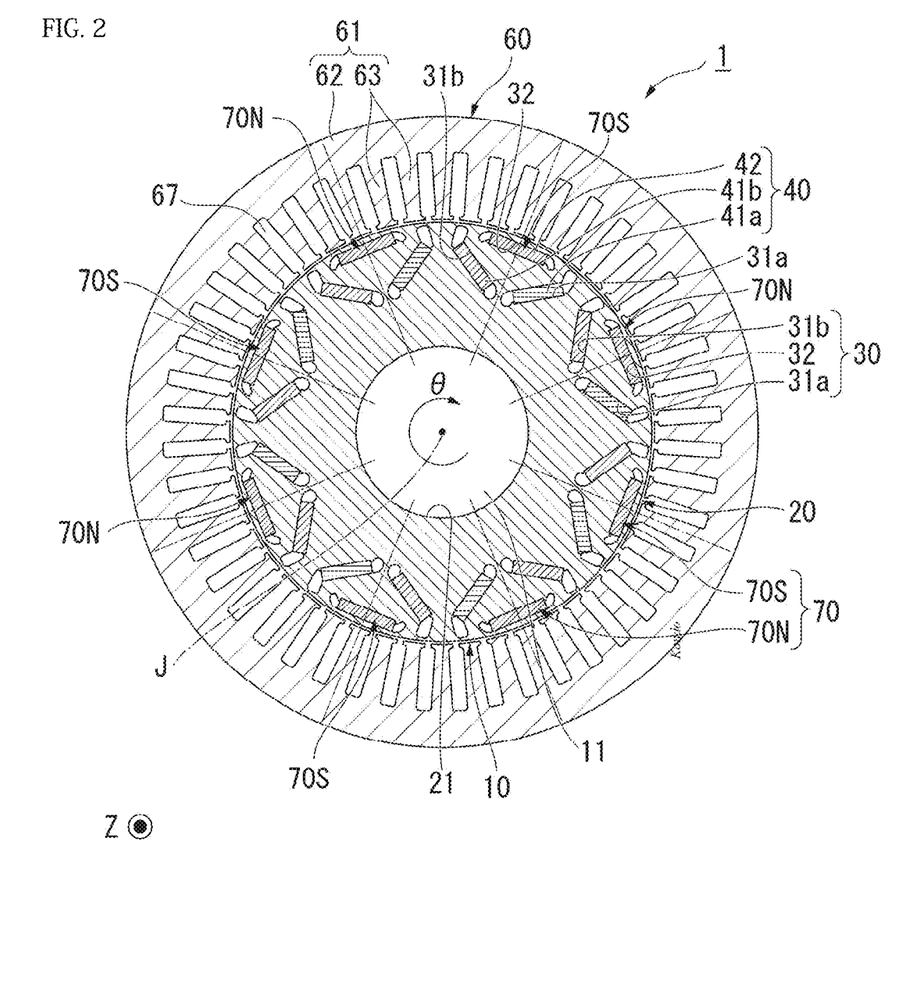
FIG. 2 is a sectional view, along a line II-II in FIG. 1, illustrating a part of the rotating electrical machine according to the embodiment.

The stator 60 is positioned radially outside the rotor 10. The stator 60 includes a stator core 61, an insulator 64, and a plurality of coils 65. As illustrated in FIGS. 1 and 2, the stator core 61 includes a core back 62 and a plurality of teeth 63. The core back 62 is located radially outside the rotor core 20 to be described later.

As illustrated in FIG. 2, the core back 62 has an annular shape surrounding the rotor core 20. The core back 62 has, for example, an annular shape centered on the central axis J.

The plurality of teeth 63 extends inwardly in the radial direction from the core back 62. The teeth 63 are spaced apart from one another in the circumferential direction. The teeth 63 are equally spaced over the entire circumference along the circumferential direction. For example, 48 teeth 63 are provided. That is, the number of slots 67 of the rotating electrical machine 1 is, for example, 48.

As illustrated in FIG. 1, the plurality of coils 65 is attached to the stator core 61. The coils 65 are attached to the teeth 63 with the insulator 64 interposed therebetween. In the present embodiment, distributed winding is used for the coils 65. That is, each coil 65 is wound across the plurality of teeth 63. In the present embodiment, full-pitch winding is used for the coils 65. That is, the circumferential pitch between slots of the stator 60 into which the coils 65 are inserted is equal to the circumferential pitch of magnetic poles generated when three-phase AC power is supplied to the stator 60. The number of poles of the rotating electrical machine 1 is, for example, eight. That is, the rotating electrical machine 1 is, for example, an 8-pole 48 slot rotating electrical machine. As described above, in the rotating electrical machine 1 according to the present embodiment, when the number of poles is N, the number of slots is N×6.

The rotor 10 is rotatable about the central axis J. As illustrated in FIG. 2, the rotor 10 includes a shaft 11, a rotor core 20, and a plurality of magnets 40. The shaft 11 has a columnar shape that extends in the axial direction about the central axis J. As illustrated in FIG. 1, the shaft 11 is rotatably supported about the central axis J by bearings 5a and 5b.

The rotor core 20 is a magnetic body. The rotor core 20 is fixed to an outer peripheral surface of the shaft 11. The rotor core 20 has a through hole 21 that penetrates the rotor core 20 in the axial direction. As illustrated in FIG. 2, the through hole 21 has a circular shape centered on the central axis J when viewed in the axial direction. The shaft 11 passes through the through hole 21. The shaft 11 is fixed inside the through hole 21 by press fitting, for example. The rotor core 20 is formed by laminating, for example, a plurality of electromagnetic steel plates 25 in the axial direction.

Figure 3:
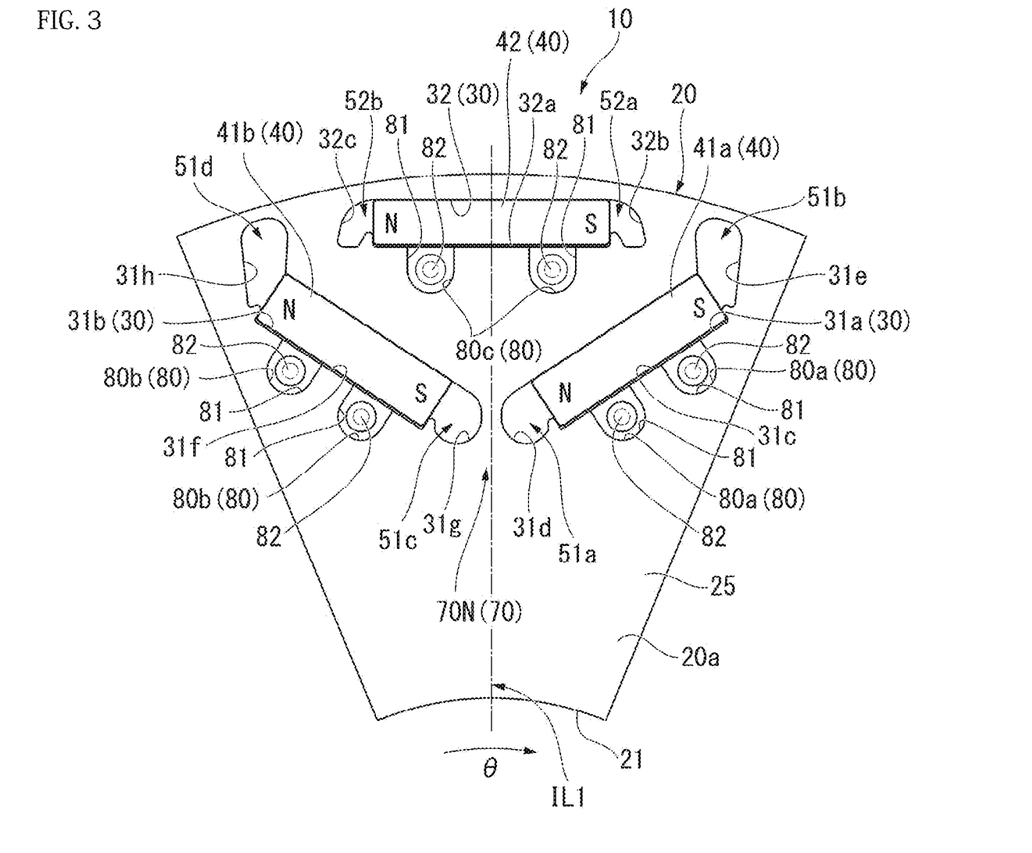
FIG. 3 is a diagram illustrating a part of a rotor core of a rotor according to the embodiment as viewed in an axial direction.
Figure 4:
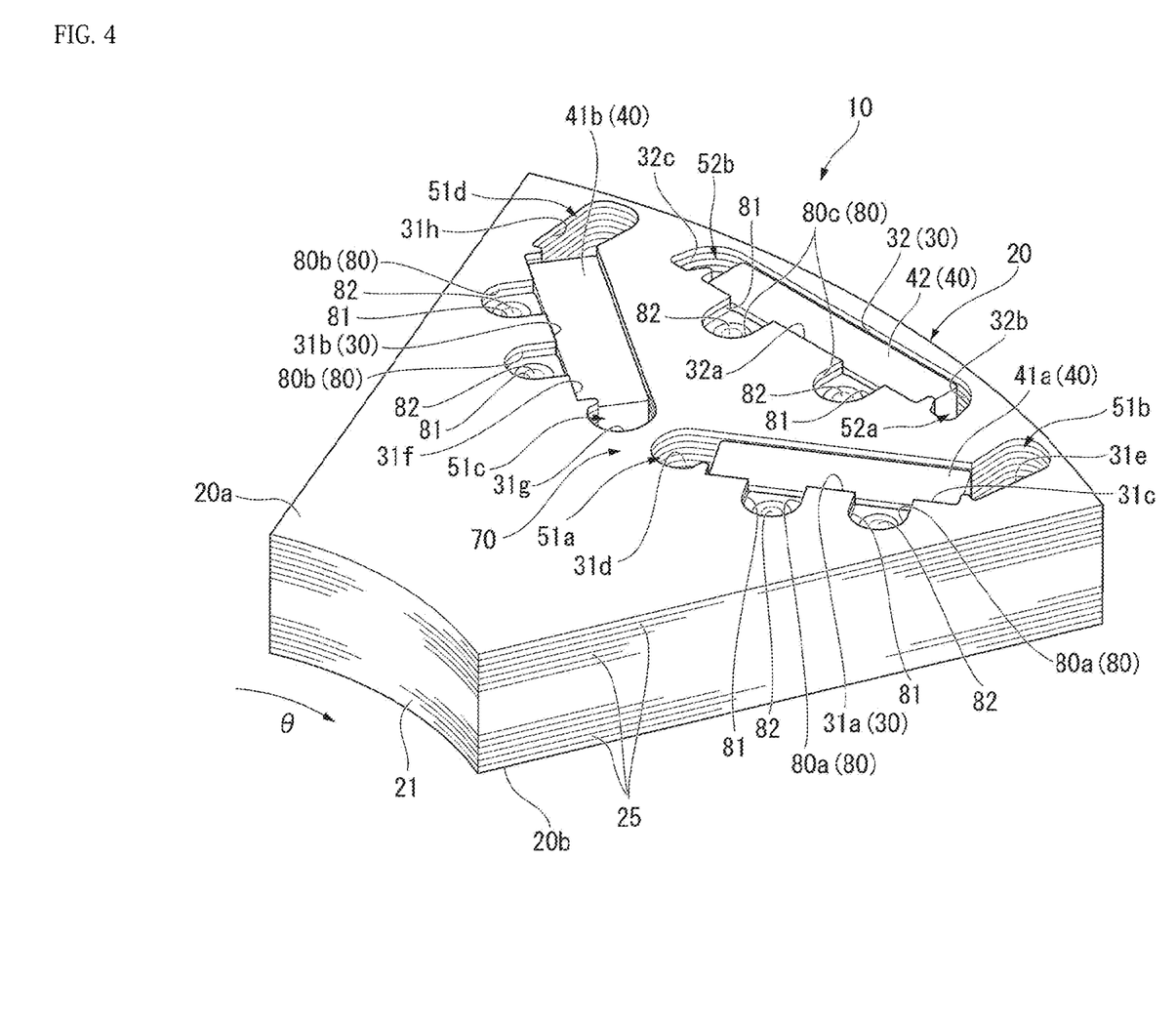
FIG. 4 is a perspective view illustrating a part of the rotor core according to the embodiment.

As illustrated in FIGS. 2 to 4, the rotor core 20 has a plurality of accommodation holes 30. For example, the plurality of accommodation holes 30 penetrates the rotor core 20 in the axial direction. The plurality of magnets 40 is accommodated in the plurality of accommodation holes 30, respectively. The plurality of accommodation holes 30 includes a pair of first accommodation holes 31a and 31b and a second accommodation hole 32.

The type of the plurality of magnets 40 is not particularly limited. The magnet 40 may be, for example, a neodymium magnet or a ferrite magnet. The plurality of magnets 40 includes a pair of first magnets 41a and 41b and a second magnet 42. The pair of first magnets 41a and 41b and the second magnet 42 constitute a pole.

In the present embodiment, a plurality of the pairs of first accommodation holes 31a and 31b, a plurality of the pairs of first magnets 41a and 41b, a plurality of the second accommodation holes 32, and a plurality of the second magnets 42 are provided at intervals in the circumferential direction. Eight pairs of first accommodation holes 31a and 31b, eight pairs of first magnets 41a and 41b, eight second accommodation holes 32, and eight second magnets 42 are provided, for example.

The rotor 10 includes a plurality of magnetic pole sections 70 each including a pair of first accommodation holes 31a and 31b, a pair of first magnets 41a and 41b, the second accommodation hole 32, and the second magnet 42. As illustrated in FIG. 2, eight magnetic pole sections 70 are provided, for example. The magnetic pole sections 70 are, for example, equally spaced over an entire circumference along the circumferential direction. The plurality of magnetic pole sections 70 includes a plurality of magnetic pole sections 70N in which the magnetic pole on the outer peripheral surface of the rotor core 20 is an N pole and a plurality of magnetic pole sections 70S in which the magnetic pole on the outer peripheral surface of the rotor core 20 is an S pole. For example, four magnetic pole sections 70N and four magnetic pole sections 70S are provided. The four magnetic pole sections 70N and the four magnetic pole sections 70S are alternately arranged along the circumferential direction. The configurations of the magnetic pole sections 70 are similar to one another except that the magnetic poles on the outer peripheral surface of the rotor core 20 are different and the circumferential positions are different.

As illustrated in FIGS. 3 and 4, the pair of first accommodation holes 31a and 31b is spaced from each other in the circumferential direction in each of the magnetic pole sections 70. For example, the first accommodation hole 31a is located on a first circumferential side (+θ side) of the first accommodation hole 31b. For example, the first accommodation holes 31a and 31b extend substantially linearly in a direction inclined obliquely with respect to the radial direction when viewed in the axial direction. The pair of first accommodation holes 31a and 31b extends in directions away from each other in the circumferential direction from inside to outside in the radial direction when viewed in the axial direction. That is, a circumferential distance between the first accommodation hole 31a and the first accommodation hole 31b increases from inside to outside in the radial direction. The first accommodation hole 31a is located, for example, further to the first circumferential side as it extends from inside to outside in the radial direction. The first accommodation hole 31b is, for example, located further to a second circumferential side (−θ side) as it extends from inside to outside in the radial direction. The outer radial ends of the first accommodation holes 31a and 31b are located at an outer peripheral end of the rotor core 20 in the radial direction.

The first accommodation hole 31a and the first accommodation hole 31b are located, for example, with a magnetic pole center line IL1 in FIG. 3 constituting a d axis therebetween in the circumferential direction when viewed in the axial direction. The magnetic pole center line IL1 is a virtual line passing through the center of the magnetic pole section 70 in the circumferential direction and the central axis J and extending in the radial direction. The first accommodation hole 31a and the first accommodation hole 31b are arranged so as to be symmetrical with respect to the magnetic pole center line IL1 when viewed in the axial direction, for example. Hereinafter, the description of the configurations of the first accommodation hole 31b same as the configurations of the first accommodation hole 31a may be omitted except that the first accommodation holes 31a and 31b are symmetrical with respect to the magnetic pole center line IL1.

The first accommodation hole 31a includes a first linear part 31c, an inner end part 31d, and an outer end part 31e. The first linear part 31c extends linearly in the direction in which the first accommodation hole 31a extends when viewed in the axial direction. The first linear part 31c has, for example, a rectangular shape when viewed in the axial direction. The inner end part 31d is connected to an inner radial end of the first linear part 31c. The inner end part 31d is an inner radial end of the first accommodation hole 31a. The outer end part 31e is connected to an outer radial end of the first linear part 31c. The outer end part 31e is an outer radial end of the first accommodation hole 31a. The outer end part 31e extends outward in the radial direction along the magnetic pole center line IL1 from the outer radial end of the first linear part 31c. The first accommodation hole 31b includes a first linear part 31f, an inner end part 31g, and an outer end part 31h.

The second accommodation hole 32 is located between the outer radial ends of the pair of first accommodation holes 31a and 31b in the circumferential direction. That is, in the present embodiment, the second accommodation hole 32 is located between the outer end part 31e and the outer end part 31h in the circumferential direction. The second accommodation hole 32 extends, for example, substantially linearly in a direction orthogonal to the radial direction when viewed in the axial direction. The second accommodation hole 32 extends, for example, in a direction orthogonal to the magnetic pole center line IL1 when viewed in the axial direction. The pair of first accommodation holes 31a and 31b and the second accommodation hole 32 are located along, for example, a V shape when viewed in the axial direction.

In the present specification, "a certain object extends in a direction orthogonal to a certain direction" includes not only a case where the certain object extends in a direction strictly orthogonal to the certain direction but also a case where the certain object extends in a direction substantially orthogonal to the certain direction. The "direction substantially orthogonal to a certain direction" includes, for example, a direction inclined within a range of about several degrees [°] with respect to the direction strictly orthogonal to the certain direction due to a tolerance or the like at the time of manufacturing.

The magnetic pole center line IL1 passes through the circumferential center of the second accommodation hole 32 when viewed in the axial direction. That is, the circumferential position of the circumferential center of the second accommodation hole 32 coincides with, for example, the circumferential position of the circumferential center of the magnetic pole section 70. The second accommodation hole 32 has, for example, a symmetrical shape with respect to the magnetic pole center line IL1 as viewed in the axial direction. The second accommodation hole 32 is located at an outer peripheral end of the rotor core 20 in the radial direction.

The second accommodation hole 32 includes a second linear part 32a, a first end part 32b, and a second end part 32c. The second linear part 32a extends linearly in the direction in which the second accommodation hole 32 extends when viewed in the axial direction. The second linear part 32a has, for example, a rectangular shape when viewed in the axial direction. The first end part 32b is connected to an end of the second linear part 32a on the first circumferential side (+θ side). The first end part 32b is an end of the second accommodation hole 32 on the first circumferential side. The first end part 32b is located on the second circumferential side (−θ side) of the outer end part 31e of the first accommodation hole 31a so as to be spaced from the outer end part 31e. The second end part 32c is connected to an end of the second linear part 32a on the second circumferential side (−θ side). The second end part 32c is an end of the second accommodation hole 32 on the second circumferential side. The second end part 32c is located on the first circumferential side of the outer end part 31h of the first accommodation hole 31b so as to be spaced from the outer end part 31h.

The pair of first magnets 41a and 41b is accommodated in the pair of first accommodation holes 31a and 31b, respectively. The first magnet 41a is accommodated in the first accommodation hole 31a. The first magnet 41b is accommodated in the first accommodation hole 31b. The pair of first magnets 41a and 41b has, for example, a rectangular shape when viewed in the axial direction. The lengths of the pair of first magnets 41a and 41b in the direction in which the first magnets 41a and 41b extend are the same. The lengths of the first magnets 41a and 41b in the direction orthogonal to the direction in which the pair of first magnets 41a and 41b extends are the same.

Figure 5:
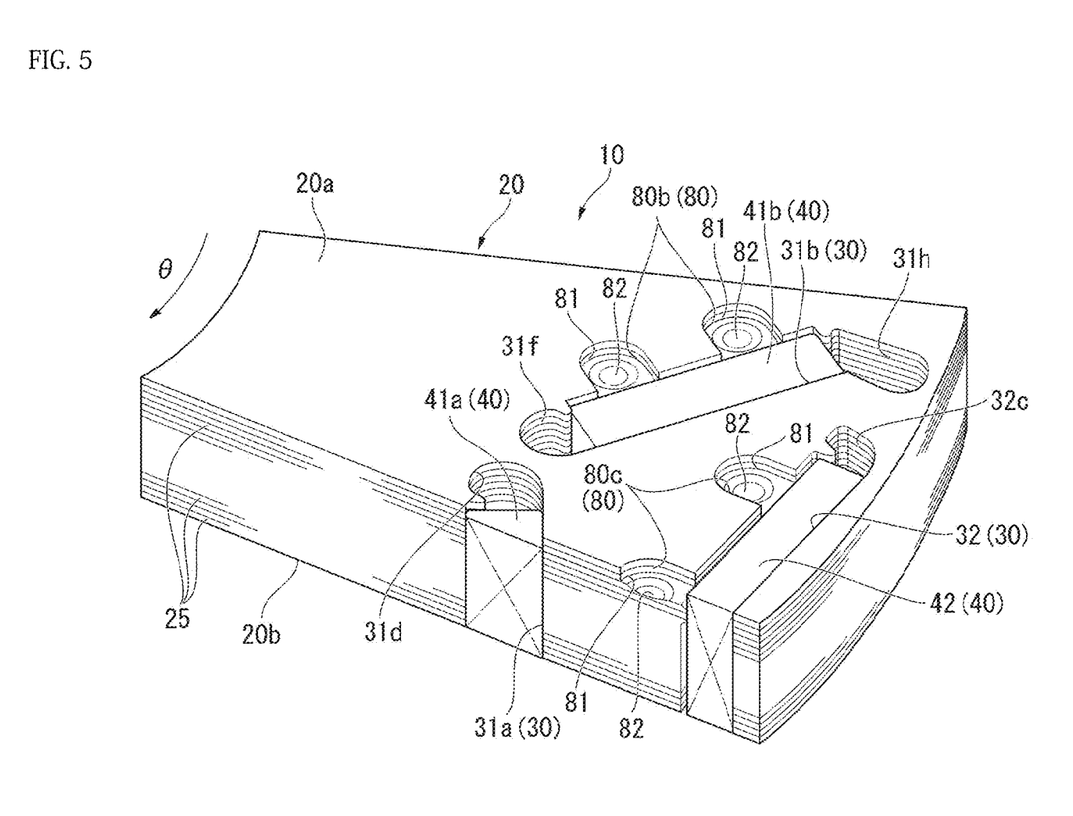
FIG. 5 is a perspective sectional view of the rotor core according to the embodiment.

The first magnets 41a and 41b have, for example, a rectangular parallelepiped shape. As illustrated in FIG. 5, the axial lengths of the first magnets 41a and 41b are slightly smaller than the entire axial lengths of the first accommodation holes 31a and 31b, for example. As illustrated in FIGS. 3 and 4, the pair of first magnets 41a and 41b is spaced from each other in the circumferential direction. The first magnet 41a is located on the first circumferential side (+θ side) of the first magnet 41b.

The first magnet 41a extends along the first accommodation hole 31a when viewed in the axial direction. The first magnet 41b extends along the first accommodation hole 31b when viewed in the axial direction. The first magnets 41a and 41b extend, for example, substantially linearly in a direction inclined obliquely with respect to the radial direction when viewed in the axial direction. The pair of first magnets 41a and 41b extends in directions away from each other in the circumferential direction from inside to outside in the radial direction when viewed in the axial direction. That is, the circumferential distance between the first magnet 41a and the first magnet 41b increases as they extend from inside to outside in the radial direction.

The first magnet 41a is located further to the first circumferential side (+θ side) as it extends from inside to outside in the radial direction. The first magnet 41b is located further to the second circumferential side (−θ side) as it extends from inside to outside in the radial direction. The first magnet 41a and the first magnet 41b are located with the magnetic pole center line IL1 therebetween in the circumferential direction when viewed in the axial direction, for example. The first magnet 41a and the first magnet 41b are located so as to be symmetrical with respect to the magnetic pole center line IL1 when viewed in the axial direction, for example. Hereinafter, the description of the configurations of the first magnet 41b same as the configurations of the first magnet 41a may be omitted except that the first magnets 41a and 41b are symmetrical with respect to the magnetic pole center line IL1.

The first magnet 41a is fitted in the first accommodation hole 31a. More specifically, the first magnet 41a is inserted into the first linear part 31c. In the direction in which the first linear part 31c extends when viewed in the axial direction, the length of the first magnet 41a is the same as, for example, the length of the first linear part 31c.

When viewed in the axial direction, each end of the first magnet 41a in the direction in which the first magnet 41a extends is separated from the corresponding end of the first accommodation hole 31a in the direction in which the first accommodation hole 31a extends. When viewed in the axial direction, the inner end part 31d and the outer end part 31e are located adjacent to the first magnet 41a on each side of the first magnet 41a in the direction in which the first magnet 41a extends. In the present embodiment, the inner end part 31d constitutes a first flux barrier section 51a. The outer end part 31e constitutes a first flux barrier section 51b. That is, the rotor core 20 includes a pair of first flux barrier sections 51a and 51b arranged with the first magnet 41a interposed therebetween in the direction in which the first magnet 41a extends when viewed in the axial direction. The rotor core 20 includes a pair of first flux barrier sections 51c and 51d arranged with the first magnet 41b interposed therebetween in the direction in which the first magnet 41b extends when viewed in the axial direction.

The first flux barrier section 51b on the outer radial side extends to the outside in the radial direction from the radial end of the first magnet 41a in parallel with the magnetic pole center line IL1. The first flux barrier section 51d located on the outer radial side extends to the outside in the radial direction from the radial end of the first magnet 41b in parallel with the magnetic pole center line IL1.

As described above, the rotor core 20 includes a pair of the first flux barrier sections 51a and 51b arranged with the first magnet 41a interposed therebetween in the direction in which the first magnet 41a extends and a pair of the first flux barrier sections 51c and 51d arranged with the first magnet 41b interposed therebetween in the direction in which the first magnet 41b extends, when viewed in the axial direction. The first flux barrier sections 51a, 51b, 51c, and 51d and second flux barrier sections 52a and 52b described later are sections where the flow of magnetic flux can be suppressed. That is, the magnetic flux hardly passes through each of the flux barrier sections. Each flux barrier section is not particularly limited as long as it can suppress the flow of magnetic flux, and it may include a void and may include a non-magnetic portion such as a resin portion.

The second magnet 42 is accommodated in the second accommodation hole 32. The second magnet 42 is located at a circumferential position between the pair of first magnets 41a and 41b on the outside in the radial direction with respect to the inner radial ends of the pair of first magnets 41a and 41b. The second magnet 42 extends along the second accommodation hole 32 when viewed in the axial direction. The second magnet 42 extends in a direction orthogonal to the radial direction as viewed in the axial direction. The pair of first magnets 41a and 41b and the second magnet 42 are located along, for example, a V shape when viewed in the axial direction.

In the present specification, "the second magnet is located at the circumferential position between the pair of first magnets" means that the circumferential position of the second magnet may be included in the circumferential position between the pair of first magnets, and the radial position of the second magnet with respect to the first magnet is not particularly limited.

The second magnet 42 has, for example, a symmetrical shape with respect to the magnetic pole center line IL1 as viewed in the axial direction. The second magnet 42 has, for example, a rectangular shape when viewed in the axial direction. When viewed in the axial direction, the radial length of the second magnet 42 is shorter than the lengths of the first magnets 41a and 41b in the direction orthogonal to the direction in which the first magnets 41a and 41b extend. Since the radial length of the second magnet 42 is set shorter than the lengths of the first magnets 41a and 41b in the direction orthogonal to the direction in which the first magnets 41a and 41b extend, the second magnet 42 is thinner, whereby the second magnet 42 has a weight smaller than the weight of each of the first magnets 41a and 41b. Since the weight of the second magnet 42 is reduced, the centrifugal force of the second magnet 42 during the rotation of the rotor 10 can be reduced. Therefore, the load on the rotor core 20 can be reduced.

Due to the second magnet 42 being thinner, the second magnet 42 can be located on the outer part of the rotor core 20 in the radial direction. Due to the second magnet 42 being located on the outer part of the rotor core 20 in the radial direction, the output of the rotating electrical machine 1 can be increased. The magnetization of the second magnet 42 is strengthened by the first magnets 41a and 41b, and thus, it is possible to increase the strength of the rotor core 20 and the output of the rotating electrical machine 1 without impairing the demagnetization resistance. Furthermore, high demagnetization resistance can be obtained with a small amount of magnets.

The second magnet 42 has, for example, a rectangular parallelepiped shape. It is possible to increase the output of the rotating electrical machine 1. The axial length of the second magnet 42 is slightly smaller than the entire axial length of the second accommodation hole 32, for example. As illustrated in FIGS. 3 and 4, the inner radial part of the second magnet 42 is located, for example, between the outer radial ends of the pair of first magnets 41a and 41b in the circumferential direction. The outer radial part of the second magnet 42 is located, for example, radially outside the pair of first magnets 41a and 41b.

The second magnet 42 is fitted in the second accommodation hole 32. More specifically, the second magnet 42 is inserted into the second linear part 32a. In the direction in which the second linear part 32a extends when viewed in the axial direction, the length of the second magnet 42 is, for example, the same as the length of the second linear part 32a.

When viewed in the axial direction, each end of the second magnet 42 in the direction in which the second magnet 42 extends is spaced from the corresponding end of the second accommodation hole 32 in the direction in which the second accommodation hole 32 extends. When viewed in the axial direction, the first end part 32b and the second end part 32c are located adjacent to the second magnet 42 on each side of the second magnet 42 in the direction in which the second magnet 42 extends. In the present embodiment, the first end part 32b constitutes a second flux barrier section 52a. The second end part 32c constitutes a second flux barrier section 52b. That is, the rotor core 20 includes a pair of second flux barrier sections 52a and 52b arranged with the second magnet 42 interposed therebetween in the direction in which the second magnet 42 extends when viewed in the axial direction.

Each of the second flux barrier sections 52a and 52b has an arc shape directed to the inside in the radial direction as it extends in the direction away from the second magnet 42 in the circumferential direction from the circumferential end of the second magnet 42. When the second flux barrier sections 52a and 52b extend to the outside in the radial direction, the distance between the second flux barrier sections 52a and 52b and the outer peripheral surface of the rotor core 20 decreases, so that the load on the rotor core 20 may increase due to the centrifugal force during rotation. Since the second flux barrier sections 52a and 52b extend to the inside in the radial direction, the load on the rotor core 20 can be reduced. Due to the second flux barrier sections 52a and 52b being formed in an arc shape, it is possible to reduce stress concentration at an intersection between the portion extending in the circumferential direction and the portion extending in the radial direction, whereby the load on the rotor core 20 can further be reduced.

The pair of second flux barrier sections 52a and 52b and the second magnet 42 are located circumferentially between the first flux barrier section 51b located on the outer radial side out of the pair of first flux barrier sections 51a and 51b provided across the first magnet 41a and the first flux barrier section 51d located on the outer radial side out of the pair of first flux barrier sections 51c and 51d provided across the first magnet 41b.

The magnetic poles of the first magnet 41a are arranged along a direction orthogonal to the direction in which the first magnet 41a extends when viewed in the axial direction. The magnetic poles of the first magnet 41b are arranged along a direction orthogonal to the direction in which the first magnet 41b extends when viewed in the axial direction. The magnetic poles of the second magnet 42 are arranged along the radial direction.

The magnetic pole located on the outer radial side out of the magnetic poles of the first magnet 41a, the magnetic pole located on the outer radial side out of the magnetic poles of the first magnet 41b, and the magnetic pole located on the outer radial side out of the magnetic poles of the second magnet 42 are the same. The magnetic pole located on the inner radial side out of the magnetic poles of the first magnet 41a, the magnetic pole located on the inner radial side out of the magnetic poles of the first magnet 41b, and the magnetic pole located on the inner radial side out of the magnetic poles of the second magnet 42 are the same.

In the magnetic pole section 70N, the magnetic pole located on the outer radial side out of the magnetic poles of the first magnet 41a, the magnetic pole located on the outer radial side out of the magnetic poles of the first magnet 41b, and the magnetic pole located on the outer radial side out of the magnetic poles of the second magnet 42 are, for example, an N pole as illustrated in FIG. 3. In the magnetic pole section 70N, the magnetic pole located on the inner radial side out of the magnetic poles of the first magnet 41a, the magnetic pole located on the inner radial side out of the magnetic poles of the first magnet 41b, and the magnetic pole located on the inner radial side out of the magnetic poles of the second magnet 42 are, for example, an S pole.

Although not illustrated, in the magnetic pole section 70S, the magnetic poles of each magnet 40 are inverted with respect to those of the magnetic pole section 70N. That is, in the magnetic pole section 70S, the magnetic pole located on the outer radial side out of the magnetic poles of the first magnet 41a, the magnetic pole located on the outer radial side out of the magnetic poles of the first magnet 41b, and the magnetic pole located on the outer radial side out of the magnetic poles of the second magnet 42 are, for example, an S pole. In the magnetic pole section 70S, the magnetic pole located on the inner radial side out of the magnetic poles of the first magnet 41a, the magnetic pole located on the inner radial side out of the magnetic poles of the first magnet 41b, and the magnetic pole located on the inner radial side out of the magnetic poles of the second magnet 42 are, for example, an N pole.

Figure 6:
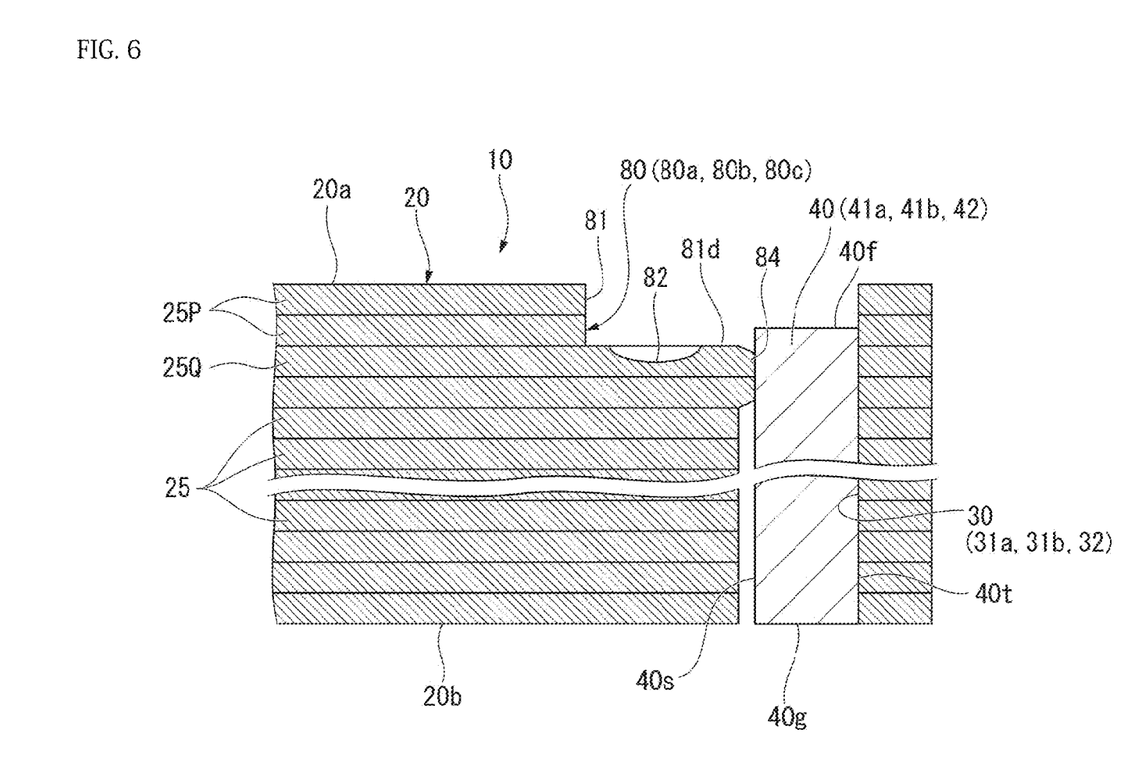
FIG. 6 is a sectional view of the rotor core according to the embodiment.

As illustrated in FIG. 6, the rotor core 20 includes a first recess 80, a first swaged part 82, and a first protrusion 84.

As illustrated in FIGS. 3 and 4, the first recess 80 is provided corresponding to each of the accommodation holes 30 (first accommodation holes 31a and 31b and second accommodation hole 32). In the present embodiment, the first recess 80 is provided adjacent to each of the accommodation holes 30 (first accommodation holes 31a and 31b, second accommodation hole 32) on the inner radial side. For example, two first recesses 80a provided corresponding to the first accommodation hole 31a are spaced from each other in the direction in which the first linear part 31c of the first accommodation hole 31a extends on the inner radial side with respect to the first linear part 31c. Two first recesses 80b provided corresponding to the first accommodation hole 31b are spaced from each other in the direction in which the first linear part 31f of the first accommodation hole 31b extends on the inner radial side with respect to the first linear part 31f. For example, two first recesses 80c provided adjacent to the second accommodation hole 32 are spaced from each other in the direction in which the second linear part 32a of the second accommodation hole 32 extends on the inner radial side with respect to the second linear part 32a.

As illustrated in FIG. 6, each of the first recesses 80 is recessed from a first core end face 20a of the rotor core 20 on the first axial side to the second axial side. The plurality of electromagnetic steel plates 25 includes one or more first electromagnetic steel plates 25P located on the first axial side and a second electromagnetic steel plate 25Q located on the second axial side with respect to the first electromagnetic steel plates 25P. Each of the first recesses 80 is defined by a notch 81 provided in one or more first electromagnetic steel plates 25P located on the first axial side. In the present embodiment, each of the first recesses 80 is defined by the notch 81 provided in, for example, two outermost first electromagnetic steel plates 25P on the first axial side. The notch 81 is provided so as to communicate with the accommodation hole 30. In the present embodiment, the notch 81 is formed into, for example, a U shape when viewed in the axial direction.

Figure 7:
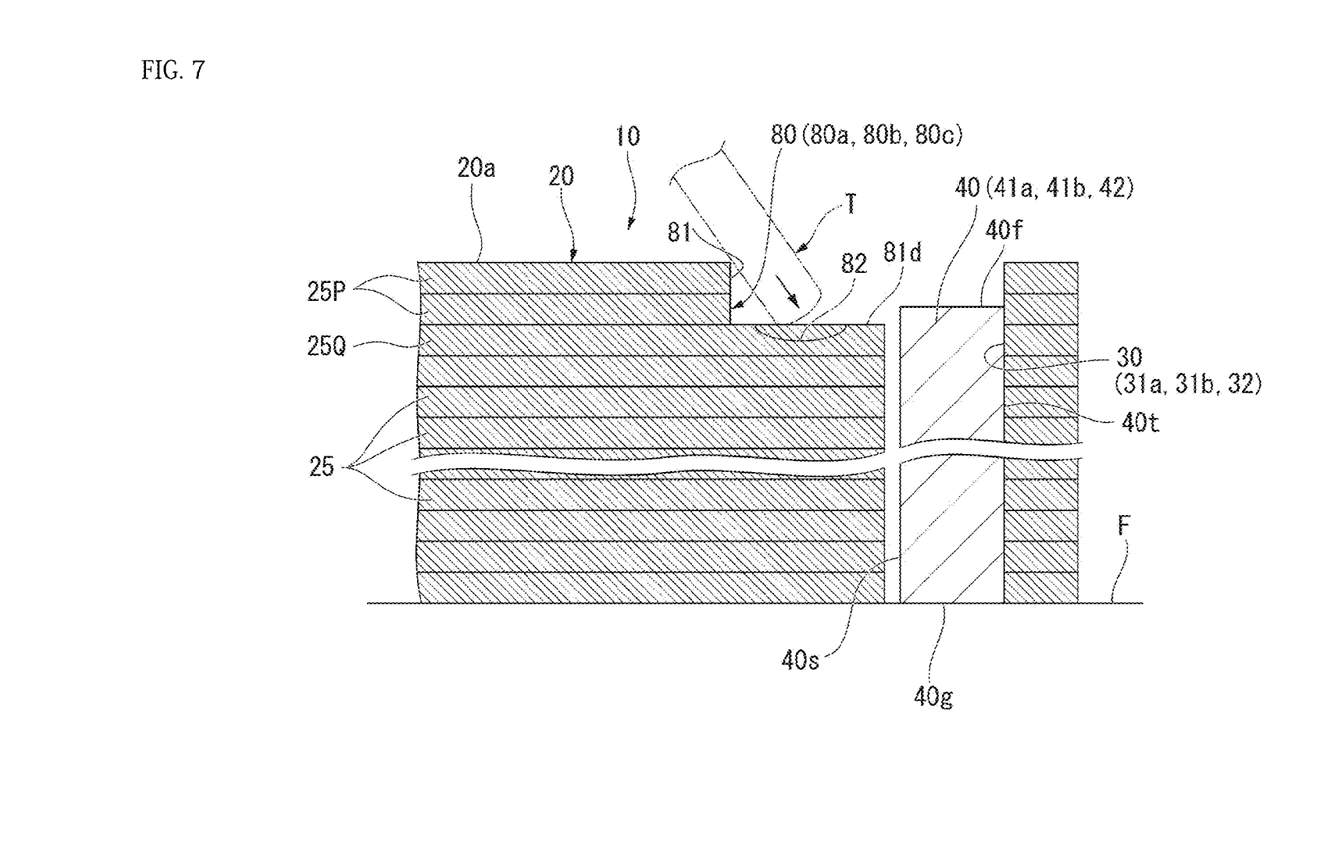
FIG. 7 is a sectional view illustrating the rotor core during assembly according to the embodiment.

A bottom surface 81d of the first recess 80 is exposed to the inside of the first recess 80 and is constituted by the second electromagnetic steel plate 25Q placed on the second axial side with respect to the first electromagnetic steel plates 25P. The bottom surface 81d of the first recess 80 is located at the same position in the axial direction as a magnet end face 40f of the magnet 40 on the first axial side or located further to the second axial side with respect to the magnet end face 40f. In the present embodiment, the bottom surface 81d of the first recess 80 is located further to the second axial side with respect to the magnet end face 40f. The magnet end face 40f is located further to the second axial side with respect to the first core end face 20a. That is, the magnet end face 40f is located further to the second axial side with respect to the first core end face 20a. A magnet end face 40g of the magnet 40 on the second axial side is located at substantially the same position in the axial direction as a second core end face 20b of the rotor core 20 on the second axial side. This is achieved by inserting the magnet 40 into each accommodation hole 30 so that the magnet end face 40g on the second axial side butts against the second core end face 20b in a state where the second core end face 20b of the rotor core 20 butts against an assembly working face F during the assembly of the rotor core 20 as illustrated in FIG. 7.

As illustrated in FIG. 6, the first swaged part 82 is provided on the bottom surface 81d of the first recess 80. As illustrated in FIG. 7, the first swaged part 82 is provided by swaging the second electromagnetic steel plate 25Q exposed to the inside of the first recess 80 with a tool T such as a punch. As illustrated in FIG. 6, the first swaged part 82 is a recess provided by swaging the second electromagnetic steel plate 25Q with the tool T.

The first protrusion 84 is provided by swaging the second electromagnetic steel plate 25Q inside the first recess 80 with the tool T so that the second electromagnetic steel plate 25Q protrudes toward the magnet 40 in the direction in which the inner peripheral edge of the accommodation hole 30 intersects the axial direction. The first protrusion 84 butts against a side face 40s of the magnet 40. When the first protrusion 84 butts against the side face 40s of the magnet 40, a side face 40t of the magnet 40 directed radially outside is pressed against the inner peripheral surface of each accommodation hole 30.

As illustrated in FIG. 6, the first protrusion 84 butts against the side face 40s of each magnet 40 (first magnets 41a and 41b and second magnet 42) directed radially inside and the side face 40t directed radially outside butts against the inner peripheral surface of the accommodation hole 30 (first accommodation holes 31a and 31b, second accommodation hole 32), whereby each magnet 40 is fixed to the rotor core 20.

According to the above configuration, the first swaged part 82 is provided on the bottom surface 81d of the first recess 80 recessed from the first core end face 20a of the rotor core 20 to the second axial side, so that the first protrusion 84 butts against the side face 40s of the magnet 40. Thus, the magnet 40 is reliably fixed to the rotor core 20. In addition, since the first protrusion 84 butts against the side face 40s of the magnet 40, the damage of the magnet 40 is suppressed. Therefore, it is possible to reliably fix the magnet 40 to the rotor core 20 while suppressing the damage of the magnet 40.

According to the above configuration, the bottom surface 81d of the first recess 80 is located at the same position in the axial direction as the magnet end face 40f of the magnet 40 on the first axial side or located further to the second axial side with respect to the magnet end face 40f, so that the first protrusion 84 reliably butts against the side face 40s of the magnet 40.

According to the above configuration, the first recess 80 can be easily formed by providing the notch 81 in the first electromagnetic steel plate 25P. Since the bottom surface 81d of the first recess 80 is defined by the second electromagnetic steel plate 25Q, the first protrusion 84 can be provided by protruding the second electromagnetic steel plate 25Q toward the magnet 40 in the direction intersecting the axial direction.

According to the above configuration, even when the magnet end face 40f does not protrude to the first axial side from the first core end face 20a and is located further to the second axial side with respect to the first core end face 20a, the magnet 40 can be reliably fixed to the rotor core 20 by butting the first protrusion 84 against the side face 40s of the magnet 40.

According to the above configuration, the magnet 40 can be placed on the outer radial side of the rotor core 20 by providing the first protrusion 84 on the inner radial side with respect to the magnet 40. Thus, the output of the rotating electrical machine 1 can be increased.

According to the above configuration, the notch 81 communicates with the accommodation hole 30, whereby the notch 81 and the accommodation hole 30 can be easily machined as one opening in the laminated steel plates.

While the preferred embodiment of the present invention has been described above with reference to the accompanying drawings, it is obvious that the present invention is not limited to the embodiment. Various shapes, combinations, and the like of the constituent members in the above embodiment are only by way of example, and various modifications are possible based on design requirements and the like without departing from the scope of the present invention.

Figure 8:
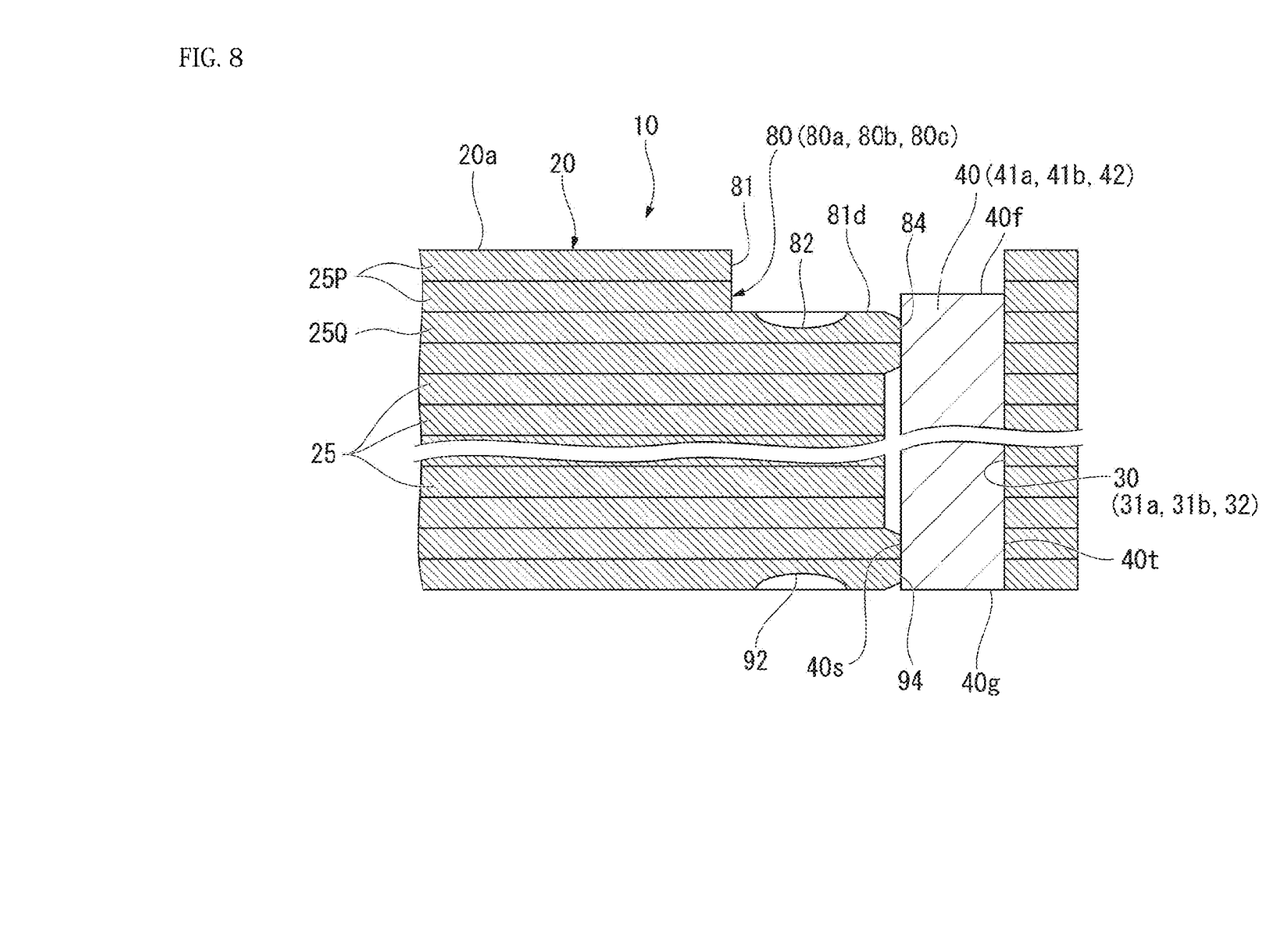
FIG. 8 is a sectional view of a rotor core according to a modification.

For example, as illustrated in FIG. 8, the rotor core may include a second swaged part 92 formed on the second core end face 20b on the second axial side, and a second protrusion 94 that protrudes toward the magnet 40 in a direction in which the inner peripheral edge of the accommodation hole 30 intersects the axial direction and that butts against the side face 40s of the magnet 40.

According to the above configuration, the second swaged part 92 and the second protrusion 94 are provided on the second core end face 20b side of the rotor core 20 on the second axial side in addition to the first protrusion 84, whereby the magnet 40 can be firmly fixed on the first axial side and on the second axial side.

Although, in the above embodiment, two first recesses 80 are provided for each accommodation hole 30, the number of the first recesses 80 is not particularly limited. One first recess 80 may be provided for each accommodation hole 30, or three or more first recesses may be provided.

In addition, although the first recess 80 is provided on the inner radial side with respect to each accommodation hole 30, the present invention is not limited thereto. The first recess 80 may be provided on the outer radial side with respect to each accommodation hole 30, or may be provided on both the inner radial side and the outer radial side with respect to each accommodation hole 30.

In addition, although the first recess 80 includes the notch 81 provided in the first electromagnetic steel plate 25P so as to face the accommodation hole 30, the present invention is not limited thereto. The first recess 80 may be a hole provided at a position separated from the accommodation hole 30.

The rotating electrical machine to which the present invention is applied is not limited to a motor, and may be a generator. In this case, the rotating electrical machine may be a three-phase AC generator. The application of the rotating electrical machine is not particularly limited. For example, the rotating electrical machine may be mounted on a vehicle or may be mounted on equipment other than a vehicle. The number of poles and the number of slots of the rotating electrical machine are not particularly limited. In the rotating electrical machine, the coil may be wound using any winding method. The features described above in the present description may be appropriately combined as long as no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotating electrical machine comprising:
a rotor rotatable about a central axis; and
a stator located radially outside the rotor,
wherein the rotor includes
a rotor core that includes a plurality of electromagnetic steel plates laminated in an axial direction, the rotor core having a plurality of accommodation holes, and
a plurality of magnets respectively accommodated in the plurality of accommodation holes,
the rotor core including
a first recess recessed from a first core end face on a first axial side to a second axial side,
a first swaged part provided on a bottom surface of the first recess, and
a first protrusion that protrudes toward each of the magnets in a direction in which an inner peripheral edge of each of the accommodation holes intersects an axial direction, the first protrusion butting against a side face of the magnet.

2. The rotating electrical machine according to claim 1, wherein the bottom surface of the first recess is located at a same position in the axial direction as a magnet end face of each of the magnets on the first axial side or located further to the second axial side with respect to the magnet end face.

3. The rotating electrical machine according to claim 1, wherein the plurality of electromagnetic steel plates includes at least one first electromagnetic steel plate located on the first axial side and a second electromagnetic steel plate located on the second axial side with respect to the at least one first electromagnetic steel plate,
the first recess is defined by a hole or a notch provided in the at least one first electromagnetic steel plate, and
the bottom surface of the first recess is exposed to an inside of the first recess and is defined by the second electromagnetic steel sheet.

4. The rotating electrical machine according to claim 1, wherein a magnet end face of each of the magnets on the first axial side is located further to the second axial side with respect to the first core end face.

5. The rotating electrical machine according to claim 1, wherein the first protrusion is located on an inner side in a radial direction intersecting the axial direction with respect to each of the magnets.

6. The rotating electrical machine according to claim 1, wherein the first recess includes a notch communicating with each of the accommodation holes.

7. The rotating electrical machine according to claim 1, wherein the rotor core includes
a second swaged part formed on a second core end face on the second axial side, and
a second protrusion that protrudes toward each of the magnets in a direction in which the inner peripheral edge of each of the accommodation holes intersects the axial direction, the second protrusion butting against the side face of the magnet.

* * * * *